(12) United States Patent  
Deng

(10) Patent No.: US 12,289,129 B2
(45) Date of Patent: Apr. 29, 2025

(54) MOBILE TERMINAL PROTECTIVE COVER

(71) Applicant: GUANGDONG XIZHONGXI TECHNOLOGY CO., LTD., Dongguan (CN)

(72) Inventor: Xiuhong Deng, Shaoyang (CN)

(73) Assignee: GUANGDONG XIZHONGXI TECHNOLOGY CO., LTD., Dongguan (CN)

( * ) Notice: Subject to any disclaimer, the term of this patent is extended or adjusted under 35 U.S.C. 154(b) by 225 days.

(21) Appl. No.: 18/307,157

(22) Filed: Apr. 26, 2023

(65) Prior Publication Data
US 2024/0313817 A1  Sep. 19, 2024

(51) Int. Cl.
G06F 1/16 (2006.01)
H04B 1/3888 (2015.01)
H05K 5/00 (2025.01)
H05K 7/00 (2006.01)

(52) U.S. Cl.
CPC ................... H04B 1/3888 (2013.01)

(58) Field of Classification Search
CPC .. H04B 1/3888; H04M 1/0262; G06F 1/1656; G06F 1/1626
See application file for complete search history.

(56) References Cited

U.S. PATENT DOCUMENTS

| | | | |
|---|---|---|---|
| 6,381,127 B1 * | 4/2002 | Maddali | G06F 1/163 D3/276 |
| 8,531,833 B2 * | 9/2013 | Diebel | H04M 1/04 361/679.41 |
| 8,885,333 B2 * | 11/2014 | Lim | H04M 1/0283 361/679.55 |
| 8,971,039 B2 * | 3/2015 | Huang | G06F 1/1626 361/679.41 |
| 9,042,095 B2 * | 5/2015 | Song | H04B 1/3827 361/679.55 |
| 10,405,440 B2 * | 9/2019 | Burdoucci | H04M 1/185 |
| 10,558,240 B2 * | 2/2020 | Vanecek | G06F 1/1633 |
| 10,886,962 B2 * | 1/2021 | Johnson | A47L 13/16 |
| 2006/0037987 A1 * | 2/2006 | Lin | A45F 5/00 206/320 |
| 2014/0085814 A1 * | 3/2014 | Kielland | F16M 13/00 361/679.55 |

* cited by examiner

Primary Examiner — Anthony M Haughton
(74) Attorney, Agent, or Firm — Daniel M. Cohn

(57) ABSTRACT

The mobile terminal protective cover includes a lower cover, an upper cover, a sealing ring arranged between the upper cover and the lower cover, a hand strap, and a support assembly arranged between the lower cover and the hand strap. The upper cover and the lower cover are enclosed to form a protective groove accommodating a mobile terminal. The upper cover and the lower cover are connected and sealed through the sealing ring. The support assembly is rotatably connected to a rear side of the lower cover. The support assembly is switched between an unfolded state and a folded state by rotating the support assembly. In the unfolded state, the support assembly supports the mobile terminal protective cover to stand. In the folded state, the support assembly is folded on the lower cover. The hand strap having elasticity is fixed to the rear side of the lower cover.

10 Claims, 6 Drawing Sheets

MOBILE TERMINAL PROTECTIVE COVER

TECHNICAL FIELD

The present disclosure relates to a technical field of mobile terminal accessories, and in particular to a mobile terminal protective cover.

BACKGROUND

With rapid development of mobile Internet, mobile terminals become a necessary necessity in people's daily life. People use the mobile terminals to go online shopping, chatting, playing games, etc. The mobile terminals generally need to be protected during use, so protective covers are created.

In a process of research and practice of the prior art, the inventor of the present disclosure finds that an assembled protective cover has following problems:
  (1) the assembled protective cove has a poor waterproof and dustproof performance;
  (2) the assembled protective cover has a single function and only has a protective function, which is hardly applied to different use scenarios; and
  (3) in order to meet needs of consumers, a size of the mobile terminal is increasing, resulting in a corresponding increase in a size of the assembled protective cover, but the assembled protective cover of a large size is inconvenient for a user to hold.

Therefore, there is an urgent need to provide a technical solution to solve the above problems.

SUMMARY

The present disclosure provides a mobile terminal protective cover, which solves technical problems that an assembled protective cover has a poor waterproof and dustproof performance, has a single function, and is inconvenient for a user to hold.

The present disclosure provides the mobile terminal protective cover. The mobile terminal protective cover comprises a lower cover, an upper cover arranged on the lower cover, a sealing ring, a support assembly, and a hand strap.

The upper cover and the lower cover are enclosed to form a protective groove. The protective groove is configured to accommodate a mobile terminal. The sealing ring is arranged between the upper cover and the lower cover. The upper cover is connected to the lower cover through the sealing ring. The upper cover and the lower cover are sealed through the sealing ring.

The support assembly is rotatably connected to a rear side of the lower cover. The support assembly is switched between an unfolded state and a folded state by rotating the support assembly. When the support assembly is in the unfolded state, the support assembly supports the mobile terminal protective cover to stand. When the support assembly is in the folded state, the support assembly is folded on the rear side of the lower cover.

Two ends of the hand strap are fixed to the rear side of the lower cover. The support assembly is arranged between the lower cover and the hand strap. The hand strap has elasticity.

Optionally, in some embodiment of the present disclosure, a clamping groove is defined on the lower cover. The sealing ring is embedded in the clamping groove. A clamping protrusion is arranged on the upper cover. A position of the clamping protrusion is corresponding to a position of the clamping groove. The clamping protrusion is inserted into the clamping groove and presses the sealing ring.

Optionally, in some embodiment of the present disclosure, an outer retaining wall and an inner retaining wall are arranged on the lower cover. The inner retaining wall is arranged on an inner side of the outer retaining wall. The clamping groove is enclosed between the outer retaining wall and the inner retaining wall. The inner retaining wall defines notches.

Optionally, in some embodiment of the present disclosure, the support assembly comprises a first support and a second support.

First convex shafts are arranged on two opposite sides of a first end of the first support. Sliding grooves corresponding to the first convex shafts are defined on the lower cover. Each of the first convex shafts is rotatably inserted into a corresponding sliding groove of the sliding grooves. Each of the first convex shafts is slidable along the corresponding sliding groove of the sliding grooves.

The second support is arranged between the first support and the lower cover. A first end of the second support is rotatably connected to the first support through a first rotating shaft. Second convex shafts are arranged on two opposite sides of a second end of the second support. First rotating grooves corresponding to the second convex shafts are defined on the lower cover. Each of the second convex shafts is rotatably inserted into a corresponding first rotating groove of the first rotating grooves.

Optionally, in some embodiment of the present disclosure, a convex plate is arranged on the rear side of the lower cover. A sinking groove is defined on the convex plate. The first support and the second support are embedded in the sinking groove when the support assembly is in the folded state.

The sliding grooves and the first rotating grooves are formed on side walls of the sinking groove. The sliding grooves and the first rotating grooves are respectively communicated with the sinking groove.

Second rotating grooves are respectively defined on two ends of the convex plate. The sinking groove is located between the two second rotating grooves. Second rotating shafts are respectively arranged on two ends of the hand strap. Two ends of the hand strap are respectively rotatably connected to the second rotating grooves through a corresponding second rotating shaft of the second rotating shafts.

Optionally, in some embodiment of the present disclosure, the mobile terminal protective cover further comprises a sleeving shell. The sleeving shell defines a mounting groove. The upper cover and the lower cover are arranged in the mounting groove. The upper cover is arranged on one side of the lower cover away from a bottom surface of the mounting groove.

The sleeving shell defines a penetration opening. The penetration opening is communicated with the mounting groove. The penetration opening is defined corresponding to the convex plate. The convex plate is inserted into the penetration opening and is exposed through the penetration opening.

Optionally, in some embodiment of the present disclosure, steps are defined on the sleeving shell. The steps are arranged at an opening of the mounting groove. The steps abut against one side of the upper cover away from the lower cover.

Optionally, in some embodiment of the present disclosure, buffer protrusions are arranged on the lower cover. The buffer protrusions are arranged on one side of the lower cover close to the upper cover. The buffer protrusions are configured to support the mobile terminal accommodated in the protective groove. The buffer protrusions define an air buffer cavity in the protective groove.

Optionally, in some embodiment of the present disclosure, positioning grooves are defined on the rear side of the lower cover. The positioning grooves are arranged corresponding to positions of the buffer protrusions.

First positioning protrusions are arranged on the sleeving shell. The first positioning protrusions are one-to-one inserted into the positioning grooves.

Optionally, in some embodiment of the present disclosure, buffer grooves are defined on the lower cover. The buffer grooves are defined on the one side of the lower cover close to the upper cover. The buffer grooves are spaced apart from the buffer protrusions, and the buffer grooves are communicated with the air buffer cavity.

Second positioning protrusions are arranged on the rear side of the lower cover. Positions of the second positioning protrusions are corresponding to positions of the buffer grooves.

Positioning openings are defines on the sleeving shell. The second positioning protrusions are one-to-one inserted into the positioning openings.

In the mobile terminal protective cover of the embodiments of the present disclosure, by arranging the sealing ring between the upper cover and the lower cover, the upper cover and the lower cover are connected to each other and are sealed through the sealing ring, so dust and water are prevented from entering into a joint between the upper cover and the lower cover, thus improving a waterproof and dustproof performance of the mobile terminal protective cover.

The support assembly is rotatably arranged on the rear side of the lower cover. The support assembly is switched between the unfolded state and the folded state by rotating the support assembly. When the support assembly is in the unfolded state, the support assembly supports the mobile terminal protective cover to stand, so the mobile terminal protective cover plays a role as a mobile terminal stand, which is convenient for the user to watch videos. When the support assembly is in the folded state, the support assembly is folded on the rear side of the lower cover, which is convenient for the user to hold the mobile terminal protective cover. Therefore, the mobile terminal protective cover is multifunctional.

The hand strap is arranged on the rear side of the lower cover, which is convenient for the user to hold.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor. In the drawing.

Figure 1:
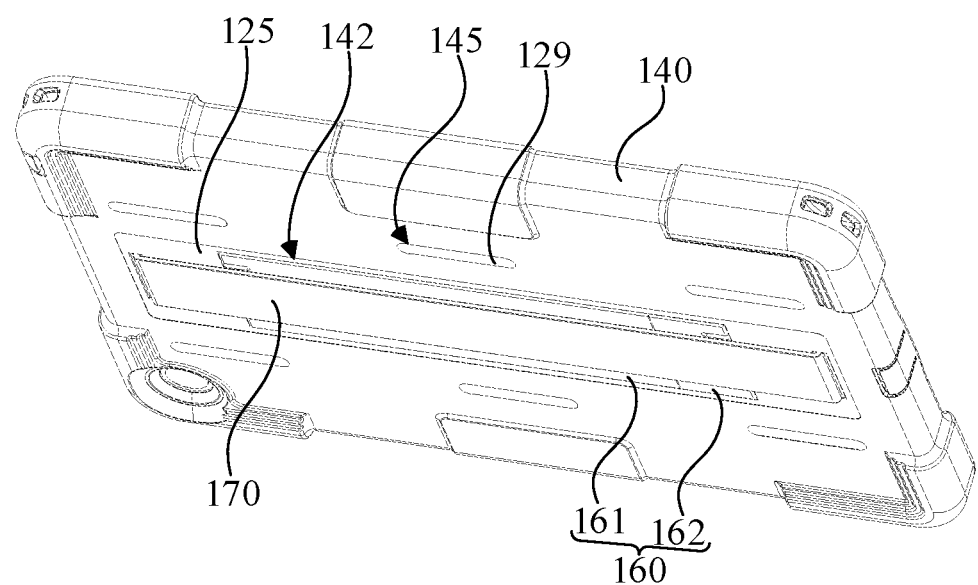
FIG. 1 is a perspective schematic diagram of a mobile terminal protective cover in a folded state according to one embodiment of the present disclosure.

In the drawings:
110—upper cover, 111—clamping protrusion, 112—limiting groove, 120—lower cover, 121—clamping groove, 123—outer retaining wall, 124—inner retaining wall, 1241—notch, 125—convex plate, 1251—sinking groove, 1252—sliding groove, 1253—first rotating groove, 1254—second rotating groove, 126—buffer protrusion, 127—positioning groove, 128—buffer groove, 129—second positioning protrusion, 130—protective groove, 131—air buffer cavity, 140—sleeving shell, 141—mounting groove, 142—penetrating opening, 1441—reinforcing rib, 145—positioning opening, 150—sealing ring, 160—support assembly, 161—first support, 1611—first convex shaft, 162—second support, 1621—second convex shaft, 1622—first rotating shaft, 170—hand strap, 171—second rotating shaft, 200—mobile terminal.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure. It is understood that the drawings are only provided for reference and illustration, and are not used to limit the present disclosure. The connection relationship shown in the drawings is only for the convenience of clear description, and does not intend to limit the connection mode.

It should be noted that when a component is considered to be "connected" to another component, it can be directly connected to another component, or there may be a centered component at the same time. Unless otherwise defined, all technical and scientific terms used herein have the same meaning as commonly understood by those skilled in the art of the present disclosure. It should be noted in the description of the present disclosure that, unless otherwise regulated and defined, terms such as "installation", "bonded", and "connection" shall be understood in broad sense, and for example, may refer to fixed connection or detachable connection or integral connection; may refer to mechanical connection or electrical connection; and may refer to direct connection or indirect connection through an intermediate medium or inner communication of two elements. For those of ordinary skill in the art, the meanings of the above terms in the present disclosure may be understood according to concrete conditions.

In addition, it should be noted that in the description of the present disclosure terms such as "central", "horizontal", "upper", "lower", "left", "right", "vertical", "horizontal", "top", "bottom", "inner", "outer", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure. In addition, terms such as "first", "second", and "third" are only used for the purpose of description, rather than being understood to indicate or imply relative importance.

Figure 2:
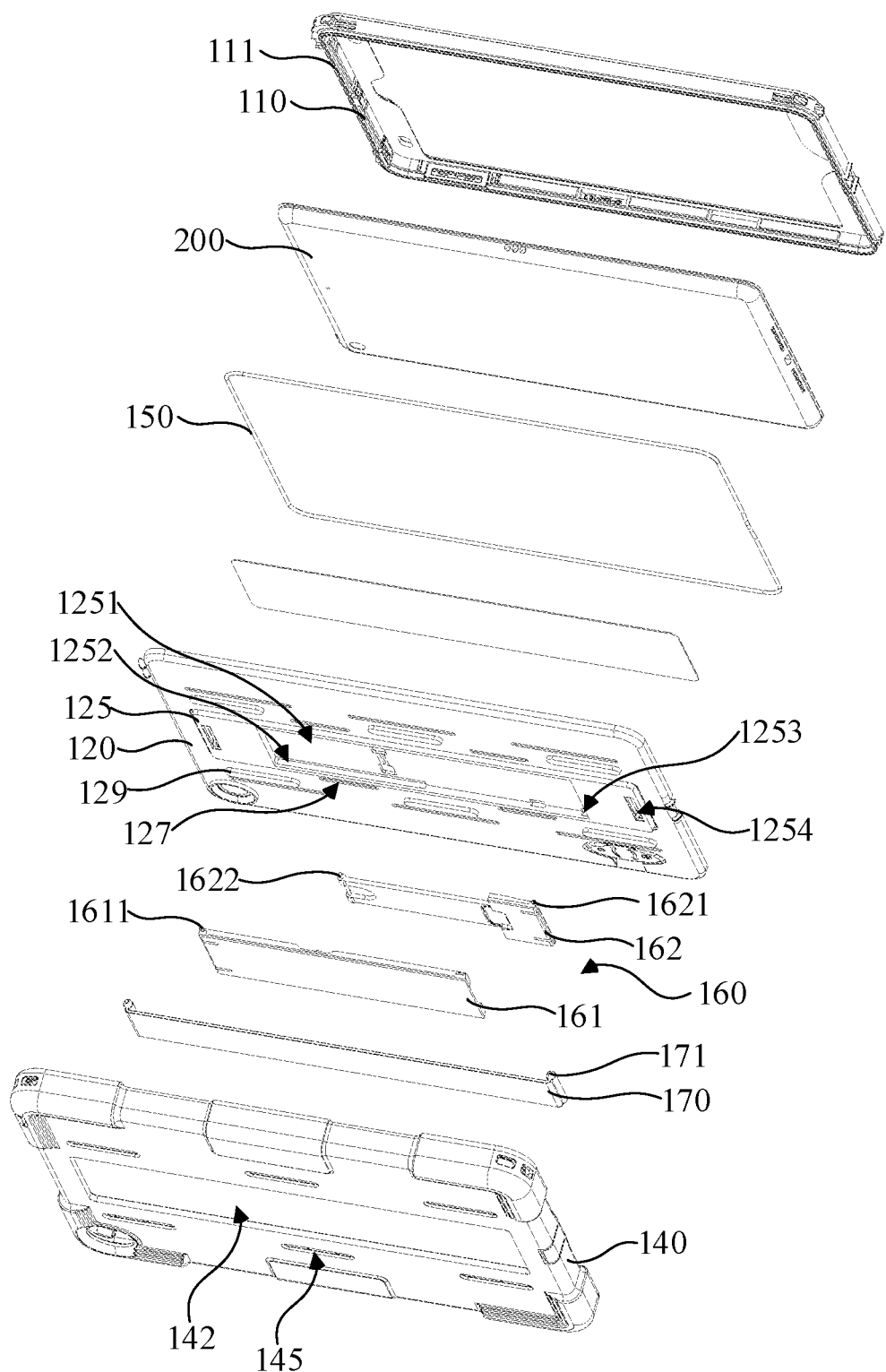
FIG. 2 is an exploded schematic diagram of the mobile terminal protective cover according to one embodiment of the present disclosure.

As shown in FIGS. 1 and 2, one embodiment of the present disclosure provides a mobile terminal protective cover. The mobile terminal protective cover comprises a lower cover 120, an upper cover 110, a sealing ring 150, a support assembly 160, and a hand strap 170.

Figure 3:
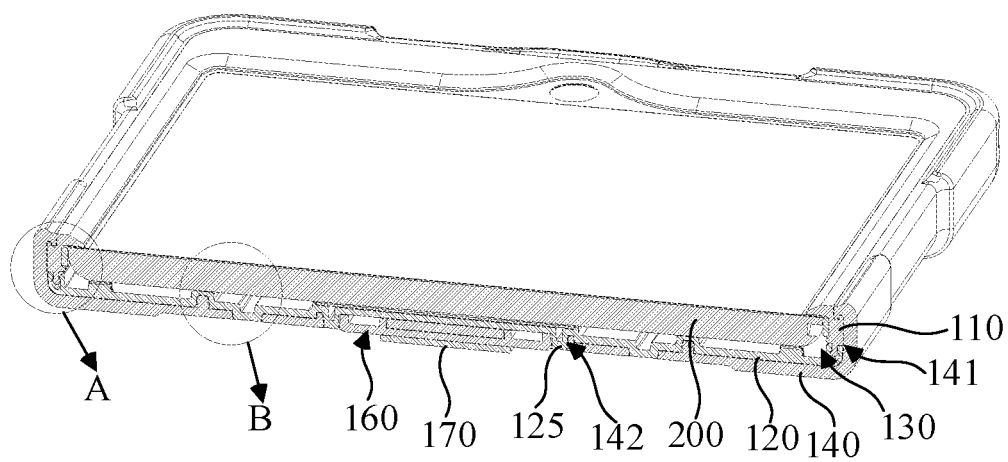
FIG. 3 is a cross-sectional schematic diagram of the mobile terminal protective cover according to one embodiment of the present disclosure.

As shown in FIG. 3, the upper cover 110 is arranged on the lower cover 120. The upper cover 110 and the lower cover 120 are enclosed to form a protective groove 130. The protective groove 130 is configured to accommodate a mobile terminal 200. The sealing ring 150 is arranged between the upper cover 110 and the lower cover 120. The upper cover 110 is connected to the lower cover 120 through the sealing ring 150. The upper cover 110 and the lower cover 120 are sealed through the sealing ring 150.

Figure 4:
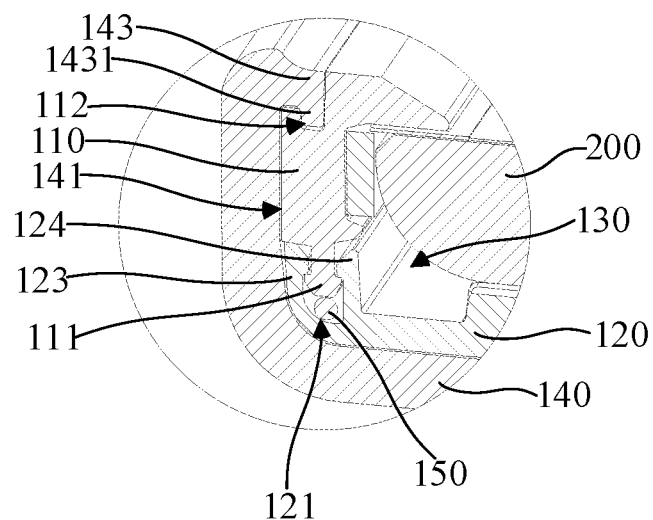
FIG. 4 is an enlarged schematic diagram of portion A shown in FIG. 3.

As shown in FIGS. 1 and 4, the support assembly 160 is rotatably connected to a rear side of the lower cover 120. The support assembly 160 is switched between an unfolded state and a folded state by rotating the support assembly 160. When the support assembly 160 is in the unfolded state, the support assembly supports the mobile terminal protective cover to stand. When the support assembly 160 is in the folded state, the support assembly 160 is folded on the rear side of the lower cover 120.

As shown in FIGS. 1, 2, and 4, two ends of the hand strap 170 are fixed to the rear side of the lower cover 120. The support assembly 160 is arranged between the lower cover 120 and the hand strap 170. The hand strap 170 has elasticity. In the folded state, a user is able to put a hand between the hand strap 170 and the lower cover 120 to hold the mobile terminal protective cover.

It should be noted that, as shown in FIG. 4, when the support assembly 160 needs to be opened, the hand strap 170 is stretched to one side of the support assembly 160, which prevents the hand strap 170 from interrupting rotation of the support assembly 160, so that the support assembly 160 is rotated to unfold the support assembly 160.

In the mobile terminal protective cover of the embodiments of the present disclosure, by arranging the sealing ring 150 between the upper cover 110 and the lower cover 120, the upper cover 110 and the lower cover 120 are connected to each other and are sealed through the sealing ring 150, so dust and water are prevented from entering into a joint between the upper cover 110 and the lower cover 120, thus improving a waterproof and dustproof performance of the mobile terminal protective cover.

The support assembly 160 is rotatably arranged on the rear side of the lower cover 120. The support assembly 160 is switched between the unfolded state and the folded state by rotating the support assembly 160. When the support assembly 160 is in the unfolded state, the support assembly supports the mobile terminal protective cover to stand, so the mobile terminal protective cover has a function of a mobile terminal stand, which is convenient for the user to watch videos. When the support assembly 160 is in the folded state, the support assembly 160 is folded on the rear side of the lower cover 120, which is convenient for the user to hold the mobile terminal protective cover. Therefore, the mobile terminal protective cover is multifunctional.

The hand strap 170 is arranged on the rear side of the lower cover 120, which is convenient for the user to hold.

Specifically, as shown in FIGS. 3, 4, and 7-10, a clamping groove 121 is defined on the lower cover 120. The sealing ring 150 is embedded in the clamping groove 121. A clamping protrusion 111 is arranged on the upper cover 110. A position of the clamping protrusion 111 is corresponding to a position of the clamping groove 121. The clamping protrusion 111 is inserted into the clamping groove 121 and presses the sealing ring 150, so that the upper cover 110 and the lower cover 120 are connected and sealed at the joint of the upper cover 110 and the lower cover 120.

Specifically, as shown in FIGS. 3, 4, 7, and 8, an outer retaining wall 123 and an inner retaining wall 124 are arranged on the lower cover 120. The inner retaining wall 124 is arranged on an inner side of the outer retaining wall 123. The clamping groove 121 is enclosed between the outer retaining wall 123 and the inner retaining wall 124. The inner retaining wall 121 defines notches 1241. By defining the notches 1241 on the inner retaining wall 124, elasticity of the inner retaining wall 124 is increased, so that the inner retaining wall 124 has a certain deformation capacity. Therefore, the sealing ring 150 is sleeved on an outer side of the inner retaining wall 124, and the clamping protrusion 111 is snapped in the clamping groove 121.

Figure 6:
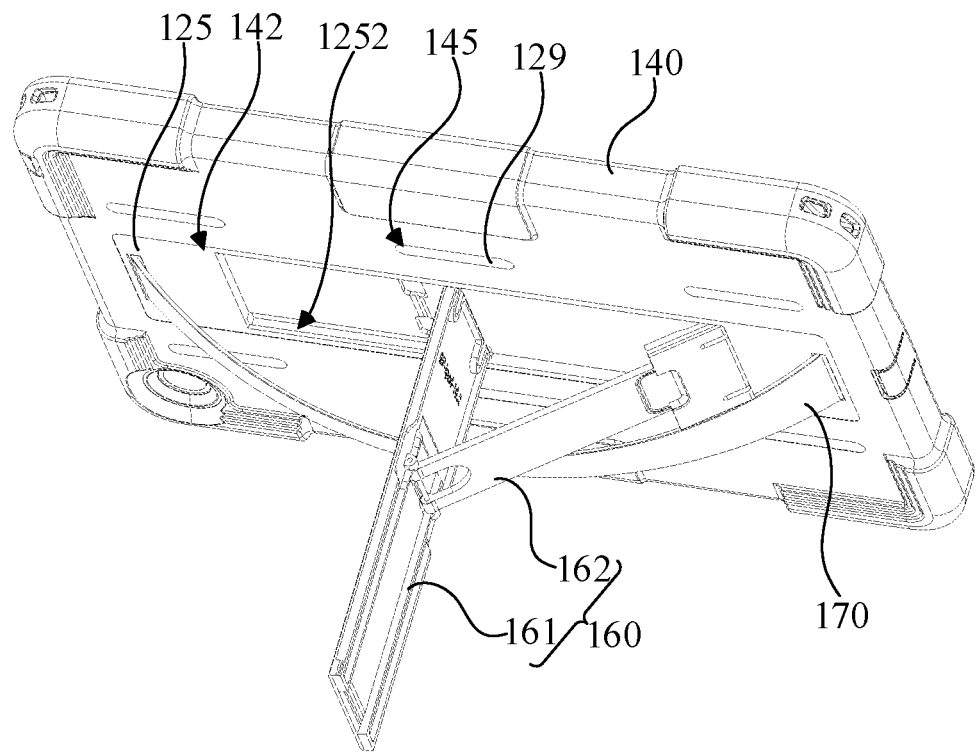
FIG. 6 is a perspective schematic diagram of the mobile terminal protective cover in an unfolded state according to one embodiment of the present disclosure.
Figure 7:
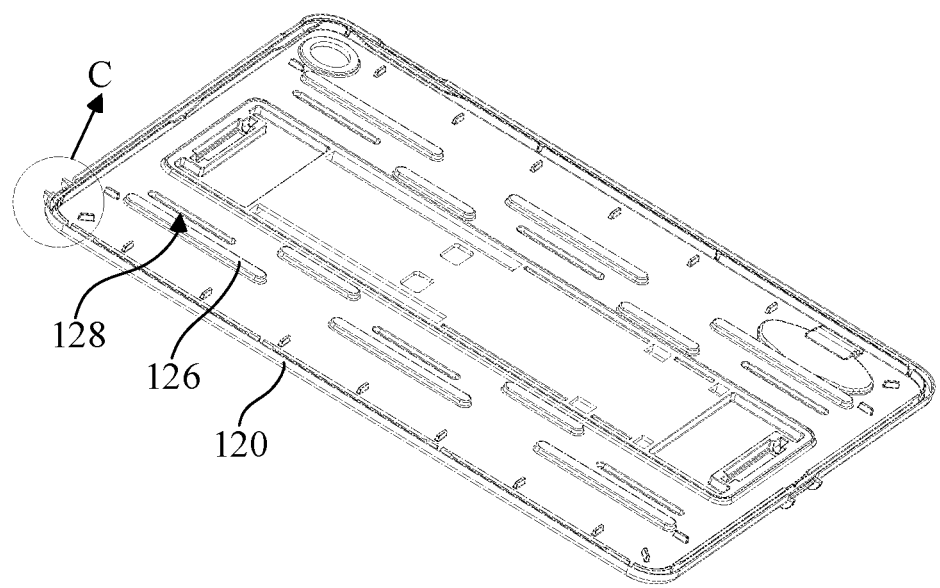
FIG. 7 is a top schematic diagram of a lower cover according to one embodiment of the present disclosure.
Figure 8:
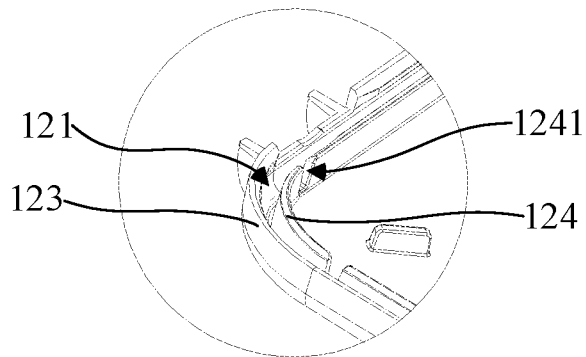
FIG. 8 is an enlarged schematic diagram of portion C shown in FIG. 7.
Figure 9:
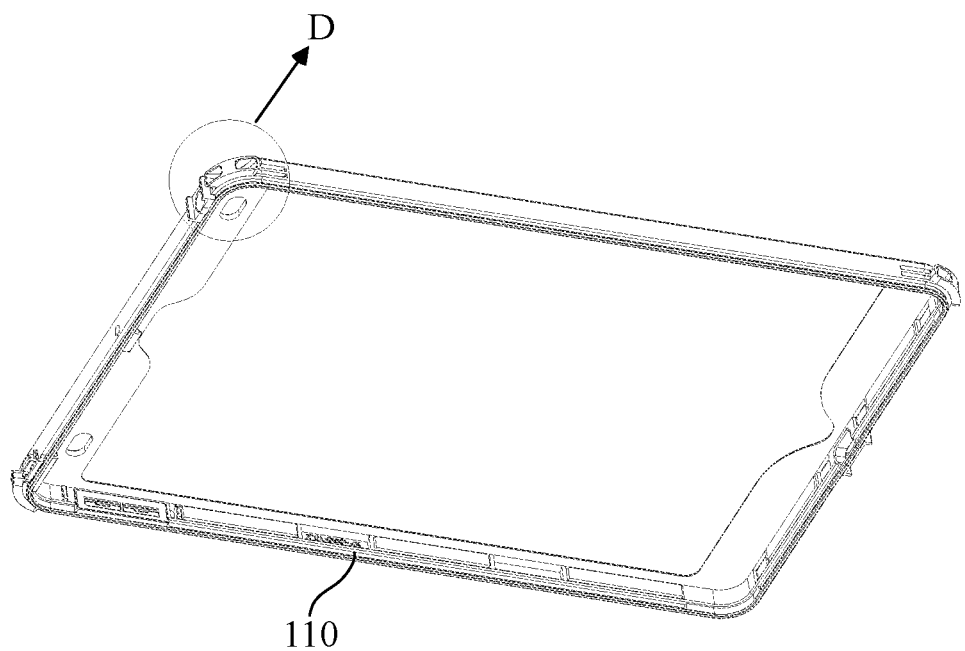
FIG. 9 is a bottom schematic diagram of an upper cover according to one embodiment of the present disclosure.
Figure 10:
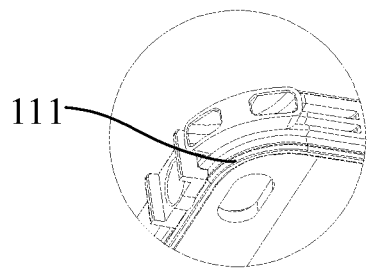
FIG. 10 is an enlarged schematic diagram of portion D shown in FIG. 9.

Specifically, as shown in FIGS. 2 and 6, the support assembly 160 comprises a first support 161 and a second support 162. First convex shafts 1611 are arranged on two opposite sides of a first end of the first support 161. Sliding grooves 1252 corresponding to the first convex shafts 16111 are defined on the lower cover 120. Each of the first convex shafts 1611 is rotatably inserted into a corresponding sliding groove 1252 of the sliding grooves 1252. Each of the first convex shafts 1611 is slidable along the corresponding sliding groove of the sliding grooves 1252. The second support 162 is arranged between the first support 161 and the lower cover 162. A first end of the second support 162 is rotatably connected to the first support 161 through a first rotating shaft 1622. Second convex shafts 1621 are arranged on two opposite sides of a second end of the second support 162. First rotating grooves 1253 corresponding to the second convex shafts 1621 are defined on the lower cover 120. Each of the second convex shafts 1621 is rotatably inserted into a corresponding first rotating groove of the first rotating grooves 1253. When the first support 161 is rotated to unfold the first support 161, since the two ends of the second support 162 are rotatably connected to a middle portion of the first support 161 and the lower cover 120, the first support 161 slides along the sliding grooves 1252 through the first convex shafts 1611 while unfolding the second support 162. When the support assembly 160 is in the unfolded state, the second support 162 assists in supporting, so that the first support 161 stably supports the mobile terminal protective cover to stand.

Specifically, as shown in FIGS. 1, 2, and 6, a convex plate 125 is arranged on the rear side of the lower cover 120. A sinking groove 1251 is defined on the convex plate 125. The first support 161 and the second support 162 are embedded in the sinking groove 1251 when the support assembly 160 is in the folded state, which reduces a volume of the mobile terminal protective cover in the folded state. In the embodiment, the sliding grooves 1252 and the first rotating grooves 1253 are formed on side walls of the sinking groove 1251. The sliding grooves 1252 and the first rotating grooves 1253 are respectively communicated with the sinking groove 1251. Second rotating grooves 1254 are respectively defined on two ends of the convex plate 125. The sinking groove 1251 is located between the two second rotating grooves 1254. Second rotating shafts 171 are respectively arranged on two ends of the hand strap 170. Two ends of the hand strap 170 are respectively rotatably connected to the second rotating grooves 1254 through a corresponding second rotating shaft 171 of the second rotating shafts 171.

Figure 11:
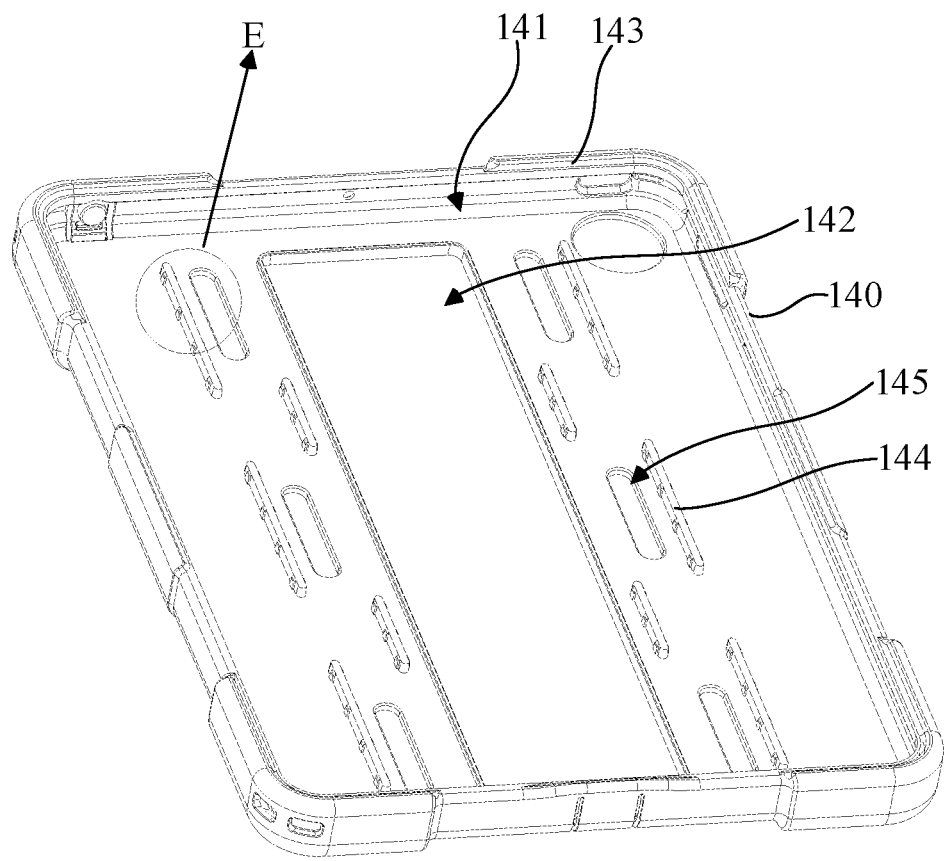
FIG. 11 is a perspective schematic diagram of a sleeving shell according to one embodiment of the present disclosure.
Figure 12:
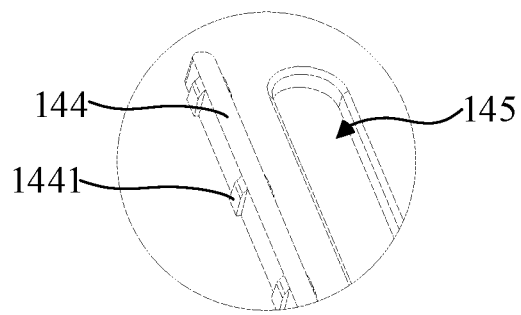
FIG. 12 is an enlarged schematic diagram of portion E shown in FIG. 11.

Specifically, as shown in FIGS. 2, 3, and 11, the mobile terminal protective cover further comprises a sleeving shell 140. The sleeving shell 140 defines a mounting groove 141. The upper cover 110 and the lower cover 120 are arranged in the mounting groove 141. The upper cover 110 is arranged on one side of the lower cover 120 away from a bottom surface of the mounting groove 141. The sleeving shell 140 defines a penetration opening 142. The penetration opening 142 is communicated with the mounting groove 141. The penetration opening 142 is defined corresponding to the convex plate 125. The convex plate 125 is inserted into the penetration opening 142 and is exposed through the penetration opening 142. The convex plate 125 cooperated with the penetrating opening 142 to position the sleeving shell 140 and the lower cover 120, which facilitates assembly of the sleeving shell 140 and the lower cover 120, Specifically, as shown in FIGS. 3 and 4, steps 143 are defined on the sleeving shell 140. The steps 143 are arranged at an opening of the mounting groove 141. The steps 143 abut against one side of the upper cover 110 away from the lower cover 120, which prevents the lower cover 120 and upper cover 110 from falling out of the mounting groove 141.

In one embodiment of the present disclosure, limiting blocks 1431 are defined on the steps 143. Limiting grooves 112 are defined on the upper cover 110. Positions of the limiting grooves are corresponding to positions of the limiting blocks 1431. Each of the limiting blocks 1431 is inserted into a corresponding limiting groove of the limiting grooves 112, so that the lower cover 120 and the upper cover 110 are stably mounted in the mounting groove 141. Of course, according to actual choices and specific requirements, the limiting blocks may be defined on the upper cover 110, the limiting grooves may be defined on the steps 143, and each of the limiting blocks is inserted into the corresponding limiting groove of the limiting grooves, which realizes the same effect and is not limited thereto.

Specifically, as shown in FIGS. 2, 3, 5 and 7, buffer protrusions 126 are arranged on the lower cover 120. The buffer protrusions 126 are arranged on one side of the lower cover 120 close to the upper cover 110. The buffer protrusions 126 are configured to support the mobile terminal 200 accommodated in the protective groove. The buffer protrusions 126 define an air buffer cavity 131 in the protective groove. When the mobile terminal 200 is dropped, air in the air buffer cavity 131 plays a buffering role, thus preventing the mobile terminal 200 from being damaged Specifically, as shown in FIGS. 2, 3, 5, 11 and 12, positioning grooves 127 are defined on the rear side of the lower cover 120. The positioning grooves 127 are arranged corresponding to positions of the buffer protrusions 126.

By setting the positioning grooves 127 corresponding to positions of the buffer protrusions 126, thicknesses of areas of the lower cover 120 corresponding to the positioning grooves 127 are increased, which is conducive to increasing depths of the positioning grooves 127. Therefore, the positioning grooves 127 play a good auxiliary positioning effect. In the embodiment, first positioning protrusions 144 are arranged on the sleeving shell 140. The first positioning protrusions 144 are one-to-one inserted into the positioning grooves 127, thereby facilitating assembly between the lower cover 120 and the sleeving shell 140.

Specifically, as shown in FIGS. 3, 5, 11 and 12, at least one reinforcing rib 1441 is arranged on each of the first positioning protrusions 144. When the first positioning protrusions 144 are one-to-one inserted into the positioning grooves 127, the at least one reinforcing rib 1441 of each of the first positioning protrusions 144 is inserted into a corresponding positioning groove 127 along with each of the first positioning protrusions 144. The at least one reinforcing rib 1441 of each of the first positioning protrusions 144 presses each of the first positioning protrusions 144 in the corresponding positioning groove 127, so that each of the first positioning protrusions 144 is in interference fit with the corresponding positioning grooves 127 through the at least one reinforcing rib 1441, which ensures stably assembly between the lower cover 120 and the sleeving shell 140.

Specifically, as shown in FIGS. 3, 5, 7, and 8, buffer grooves 128 are defined on the lower cover 120. The buffer grooves 128 are defined on the one side of the lower cover 120 close to the upper cover 110. The buffer grooves 128 are spaced apart from the buffer protrusions 126, and the buffer grooves 128 are communicated with the air buffer cavity 131. The buffer grooves 128 increase a volume of the air buffer cavity 131, so that the air buffer cavity 131 is able to accommodate more air, which improves a buffer effect of the air buffer cavity 131.

Figure 5:
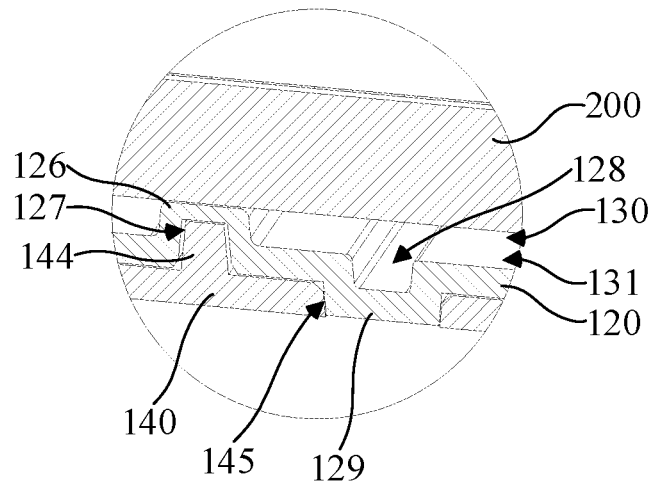
FIG. 5 is an enlarged schematic diagram of portion B shown in FIG. 3.

Specifically, as shown in FIGS. 2, 3, and 5, second positioning protrusions 129 are arranged on the rear side of the lower cover 120. Positions of the second positioning protrusions 129 are corresponding to positions of the buffer grooves 128, so thicknesses of areas of the lower cover 120 corresponding to the buffer grooves 128 are increased, which is conducive to increasing depths of the buffer grooves 128 and further increase the volume of the air buffer cavity 131, so that the air buffer cavity 131 is able to accommodate more air, and the buffer effect of the air buffer cavity 131 is further improved. In the embodiment, positioning openings 145 are defines on the sleeving shell 140. The second positioning protrusions 129 are one-to-one inserted into the positioning openings 145, which plays a good auxiliary positioning effect and facilitates the assembly between the lower cover 120 and the sleeving shell 140.

In the specification and claims of the present disclosure, terms "include/comprise" and terms "have/contain" and their variants are used to designate existence of stated features, values, steps or components, but do not exclude the existence or addition of one or multiple other features, values, steps, components, or combinations thereof.

For clarity of explanation, some features of the present disclosure are described in different embodiments. However, these features can also be combined and described in a single embodiment. Moreover, some features of the present disclosure are only described in a single embodiment for the sake of brevity. However, these features can also be described in different embodiments separately or in any suitable combination.

Foregoing descriptions are only optional embodiments of the present disclosure and are not intended to limit the present disclosure. Any modification, equivalent replacement, or improvement within the technical scope of the present disclosure should be included in the protection scope of the present disclosure.

What is claimed is:

1. A mobile terminal protective cover, comprising:
a lower cover,
an upper cover arranged on the lower cover,
a sealing ring,
a support assembly, and
a hand strap;
wherein the upper cover and the lower cover are enclosed to form a protective groove; the protective groove is configured to accommodate a mobile terminal; the sealing ring is arranged between the upper cover and the lower cover; the upper cover is connected to the lower cover through the sealing ring; the upper cover and the lower cover are sealed through the sealing ring;
wherein the support assembly is rotatably connected to a rear side of the lower cover; the support assembly is switched between an unfolded state and a folded state by rotating the support assembly; when the support assembly is in the unfolded state, the support assembly supports the mobile terminal protective cover to stand; when the support assembly is in the folded state, the support assembly is folded on the rear side of the lower cover; and
wherein two ends of the hand strap are fixed to the rear side of the lower cover; the support assembly is arranged between the lower cover and the hand strap; the hand strap has elasticity.

2. The mobile terminal protective cover according to claim 1, wherein a clamping groove is defined on the lower cover; the sealing ring is embedded in the clamping groove; a clamping protrusion is arranged on the upper cover; a position of the clamping protrusion is corresponding to a position of the clamping groove; the clamping protrusion is inserted into the clamping groove and presses the sealing ring.

3. The mobile terminal protective cover according to claim 2, wherein an outer retaining wall and an inner retaining wall are arranged on the lower cover; the inner retaining wall is arranged on an inner side of the outer retaining wall; the clamping groove is enclosed between the outer retaining wall and the inner retaining wall; the inner retaining wall defines notches.

4. The mobile terminal protective cover according to claim 1, wherein the support assembly comprises a first support and a second support;
wherein first convex shafts are arranged on two opposite sides of a first end of the first support; sliding grooves corresponding to the first convex shafts are defined on the lower cover; each of the first convex shafts is rotatably inserted into a corresponding sliding groove of the sliding grooves; each of the first convex shafts is slidable along the corresponding sliding groove of the sliding grooves;
wherein the second support is arranged between the first support and the lower cover; a first end of the second support is rotatably connected to the first support through a first rotating shaft; second convex shafts are arranged on two opposite sides of a second end of the second support; first rotating grooves corresponding to the second convex shafts are defined on the lower cover; each of the second convex shafts is rotatably inserted into a corresponding first rotating groove of the first rotating grooves.

5. The mobile terminal protective cover according to claim 4, wherein a convex plate is arranged on the rear side of the lower cover; a sinking groove is defined on the convex plate; the first support and the second support are embedded in the sinking groove when the support assembly is in the folded state;
wherein the sliding grooves and the first rotating grooves are formed on side walls of the sinking groove; the sliding grooves and the first rotating grooves are respectively communicated with the sinking groove;
wherein second rotating grooves are respectively defined on two ends of the convex plate; the sinking groove is located between the two second rotating grooves; second rotating shafts are respectively arranged on two ends of the hand strap; two ends of the hand strap are respectively rotatably connected to the second rotating grooves through a corresponding second rotating shaft of the second rotating shafts.

6. The mobile terminal protective cover according to claim 5, wherein the mobile terminal protective cover further comprises a sleeving shell; the sleeving shell defines a mounting groove; the upper cover and the lower cover are arranged in the mounting groove; the upper cover is arranged on one side of the lower cover away from a bottom surface of the mounting groove;
wherein the sleeving shell defines a penetration opening; the penetration opening is communicated with the mounting groove; the penetration opening is defined corresponding to the convex plate; the convex plate is inserted into the penetration opening and is exposed through the penetration opening.

7. The mobile terminal protective cover according to claim 6, wherein steps are defined on the sleeving shell; the steps are arranged at an opening of the mounting groove; the steps abut against one side of the upper cover away from the lower cover.

8. The mobile terminal protective cover according to claim 6, wherein buffer protrusions are arranged on the lower cover; the buffer protrusions are arranged on one side of the lower cover close to the upper cover; the buffer protrusions are configured to support the mobile terminal accommodated in the protective groove; the buffer protrusions define an air buffer cavity in the protective groove.

9. The mobile terminal protective cover according to claim 8, wherein positioning grooves are defined on the rear side of the lower cover; the positioning grooves are arranged corresponding to positions of the buffer protrusions;
wherein first positioning protrusions are arranged on the sleeving shell; the first positioning protrusions are one-to-one inserted into the positioning grooves.

10. The mobile terminal protective cover according to claim 8, wherein buffer grooves are defined on the lower cover; the buffer grooves are defined on the one side of the lower cover close to the upper cover; the buffer grooves are spaced apart from the buffer protrusions, and the buffer grooves are communicated with the air buffer cavity;
wherein second positioning protrusions are arranged on the rear side of the lower cover; positions of the second positioning protrusions are corresponding to positions of the buffer grooves;
wherein positioning openings are defines on the sleeving shell; the second positioning protrusions are one-to-one inserted into the positioning openings.

* * * * *